Feb. 25, 1947.  F. W. GODSEY, JR  2,416,300

STABILIZER APPARATUS

Filed May 24, 1945

WITNESSES:
E. H. Lutz
Nicholas Hill

INVENTOR
FRANK W. GODSEY, JR.
BY
a. B. Reavis
ATTORNEY

Patented Feb. 25, 1947

2,416,300

UNITED STATES PATENT OFFICE 2,416,300

STABILIZER APPARATUS

Frank W. Godsey, Jr., Mount Lebanon, Pa., assignor to Westinghouse Electric Corporation, East Pittsburgh, Pa., a corporation of Pennsylvania Application May 24, 1945, Serial No. 595,575

4 Claims. (Cl. 172—36)

The invention relates to gyroscopes and it has for an object to provide apparatus of this character wherein the rotor encompasses its driving motor and the frame for the rotor is of such construction as to provide for a relatively high ratio of weight of the rotor to that of the frame, rotor and motor assembly.

A further object of the invention is to provide a one-piece frame for a gyro rotor and its motor together with such construction of the rotor and its spindle, the motor, and the supporting bearings, that manufacture of component parts and the assembly and dismantling thereof are facilitated.

In many gyro applications, it is highly desirable to have a gyro whose moment of inertia with respect to the spin axis is relatively large in relation to its moment of inertia with respect to a transverse axis. This requirement leads to a gyro of the flat type to assure of a diameter which is larger than its axial length. The gyro of the present invention not only satisfies this requirement from a dimensional point of view, but, because of the open and approximately elliptical frame, the moment of inertia about the transverse axis is even further reduced and the capability of inserting and removing the component parts of the rotor and its driving motor facilitates the manufacture and assembly of the component parts.

A further object of the invention is to provide a gyro having the advantageous features of construction just mentioned.

Figure 1:
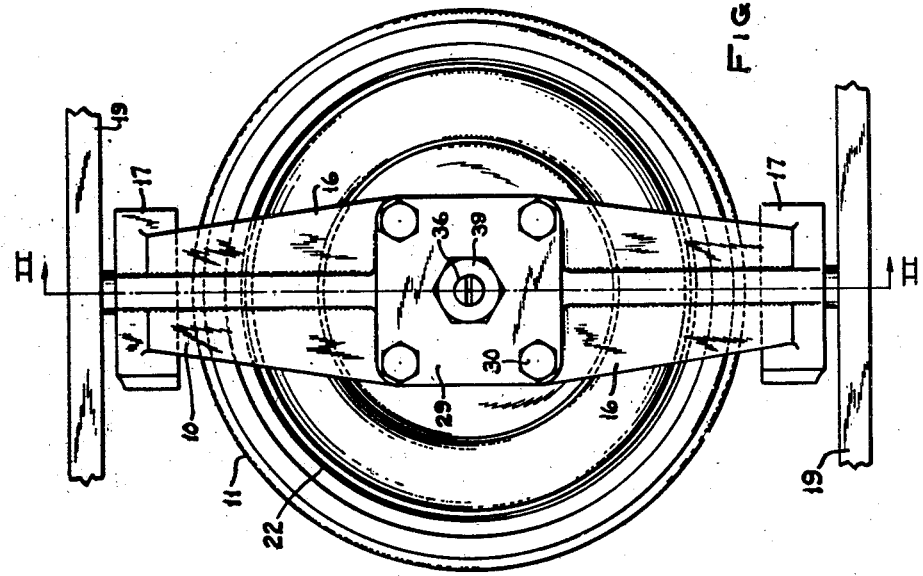
Figure 2:
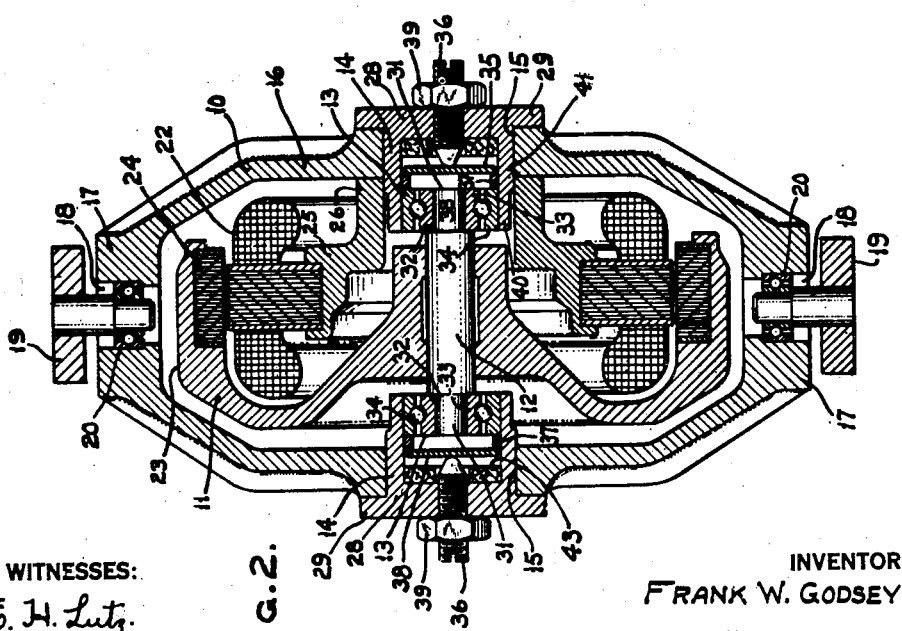

These and other objects are effected by the invention as will be apparent from the following description and claims taken in connection with the accompanying drawings, forming a part of this application, in which:

Fig. 1 is a side elevational view showing the improved gyro rotor, driving motor and frame assembly; and Fig. 2 is a sectional view taken along the line II—II of Fig. 1.

In the drawings, there is shown a one-piece generally elliptical frame 10 for the umbrella-shaped rotor 11 whose spindle 12 is mounted in bearings 13 carried by cups 14 fitting openings 15 formed in the side members 16 of the frame. The end portions 17 of the frame have aligned openings 18 whose axis intersects the axis of the openings 15 at right angles. The frame is supported from any suitable structure 19 by means of bearings 20 fitting the openings 18.

The rotor 11 is driven by an electric motor including a wound stator 22 which is encompassed by the rotor rim portion 23 provided internally with armature means indicated generally at 24. The stator includes a hub structure 25 having a lateral sleeve extension 26 fitting about the adjacent cup 14 with sufficient tightness to support the stator from the frame coaxially with the rotor 11.

As the frame member 10 is in the form of a ring, the rotor assembly and its motor are dimensioned so that, with the cups 14 withdrawn, the nested rotor assembly and motor are readily movable to and from positional relation with the ring for connection and disconnection thereof with respect to the latter. With the stator structure nested in the rotor assembly, such parts are brought into axial alignment with the openings 15, whereupon the cups 14 are moved inwardly to overlap the spindle ends with the bearings 13 supporting the rotor assembly from the cups and the stator sleeve extension 26 fitting about the adjacent cup with adequate tightness to support the stator in coaxial relation with respect to the rotor. Each cup 14 has a bottom portion 28 with a flange 29 extending outwardly therefrom and adapted to abut outer faces of the frame side portions 16 when the cups are fully inserted. After insertion, the cups are fastened to the side members by screws 30.

Not only is it desirable that the rotary parts operate freely without looseness or end play but also that the capacity shall exist to bring the center of gravity of the rotor into desired relation with respect to the point of intersection of the gyro axes, that is, to the point of intersection of the axes of the bearing openings 15 and 18. To accomplish these purposes, the spindle 12 has end portions 31 of reduced diameter joined by shoulders 32 to the main portion of the spindle. The roller bearings 13 include inner raceway rings 33 receiving the spindle end portions 31 and outer raceway rings 34 each having a close sliding fit within its cup 14. The cups 14 are provided with thrust members 35 engageable with the outer raceway rings 34 and with thrust screws 36 engageable with the thrust members. The screws 36 are adjusted to obtain the desired running relation and to position the rotor for proper relation of its center of gravity to the intersection of the gyro axes, the screws being adjusted to clamp the ball bearings between the shoulders 32 and the thrust members 35. As shown, each thrust member preferably includes a spacer ring 37 engageable with the associated outer raceway rings 34 and engaged by a disk 38 against which the associated screw 36 is adapted to press. After adjusting the screw 36 to the extent required for the above purposes, they are held in this position by means of the jam nuts 39.

To facilitate insertion of the cups 14 in the openings 15, each of the latter is preferably provided with an inner portion 40 of slightly reduced diameter, the inner portions serving to center the cups as they enter the openings. Furthermore, with the cups fully inserted, annular portions 41 thereof of larger diameter than the inner portions space the latter from the inner sides of the frame side members 16, with the result that centering of the stator sleeve portion and the associated cup 14 is effected incident to assembly of the stator on the latter, in consequence of which the stator may be readily pressed onto the cup with the desired tight fit. To provide for lubrication of the bearings 13, each cup has a felt washer 43 at the bottom thereof and through which the screw 36 extends, the washer being saturated with suitable oil.

While the invention has been shown in but one form, it will be obvious to those skilled in the art that it is not so limited, but is susceptible of various changes and modifications without departing from the spirit thereof.

What is claimed is:

1. In a gyroscope, a one-piece approximately elliptical and open frame or ring member having side portions provided with axially-aligned openings; a rotor assembly between the side portions including an umbrella rotor carried by a spindle; an electric motor for driving the rotor; said motor including a wound stator encompassed by the rotor and cooperating with armature means carried by the latter; said rotor assembly and the motor in nested relation with respect thereto being dimensioned for movement freely into and out of the frame incident to assembly and dismantling thereof with respect to the latter; means for supporting the rotor assembly and the motor stator from the frame member in coaxial relation with respect to said openings including cups insertable in and removable from said openings, said cups, when inserted, fitting the openings and extending inwardly of the frame side portions so as to overlap the ends of the spindle, bearings mounted internally of the cups and supporting the spindle ends, means carried by the cups for adjusting the bearings to position the rotor assembly axially with the bearings in proper running relation, and a sleeve element extending laterally from said stator and encompassing the adjacent cup with sufficient tightness to support the stator from the frame member in coaxial relation with the rotor; and means for fastening the inserted cups to the frame member.

2. In a gyroscope, a one-piece approximately elliptical and open frame or ring member having side portions joined by end portions; said side portions having axially-aligned bearing openings and said end portions having axially-aligned bearing openings whose axis intersects the axis of the first bearing openings at right angles; a rotor assembly between the side portions and including an umbrella rotor carried by a spindle; an electric motor for driving the rotor; said motor including a wound stator encompassed by the rotor and cooperating with armature means carried by the latter; said rotor assembly and the motor in nested relation with respect thereto being dimensioned for movement freely into and out of the frame incident to assembly and dismantling thereof with respect to the latter; means for supporting the rotor assembly and the motor stator from the frame member in coaxial relation with respect to the openings in the side portions and including cups insertable in and removable from said openings, said cups, when inserted, fitting the openings and extending inwardly of the side portions so as to overlap the ends of the spindle, bearings mounted internally of the cups and supporting the spindle ends, means carried by the cups for adjusting the bearings to position the rotor assembly axially with the bearings in proper running relation, and a sleeve element extending laterally from said stator and encompassing the adjacent cup with sufficient tightness to support the stator from the frame member in coaxial relation with the rotor; and means for fastening the inserted cups to the frame member.

3. In a gyroscope, a one-piece approximately elliptical and open frame or ring member having side portions provided with axially-aligned openings; a rotor assembly between the side portions and including an umbrella rotor carried by a spindle; said spindle having end portions of reduced diameter joined by shoulders to the body portion thereof; an electric motor for driving the rotor; said motor including a wound stator encompassed by the rotor and cooperating with armature means carried by the latter; said rotor assembly and the motor in nested relation with respect thereto being dimensioned for movement freely into and out of the frame incident to assembly and dismantling with respect to the latter; means for supporting the rotor assembly and the motor stator from the frame member in coaxial relation with respect to said openings including cups insertable in and removable from said openings, said cups, when inserted, fitting the openings and extending inwardly of said side portions so as to overlap the end portions of the spindle, ball bearings including inner and outer raceway rings with the outer raceway rings slidably mounted internally of the cups and with the inner raceway rings having the spindle end portions fitted therein, thrust members arranged internally of the cups and engaging the outer raceway rings, thrust screws cooperating with the thrust members to position the bearings axially for a desired axial location of the rotor with the bearings confined between the shoulders and the thrust members so as to be in proper running relation, and a sleeve element extending laterally from said stator and encompassing the adjacent cup with sufficient tightness to support the stator from the frame member in coaxial relation with the rotor; and means for fastening the inserted cups to the frame.

4. Apparatus as claimed in claim 3 wherein the cups have their inner end portions of slightly reduced diameter to facilitate insertion thereof in the frame member openings and engagement of the stator sleeve element in tightly fitting relation with respect to its supporting cup.

FRANK W. GODSEY, Jr.